United States Patent [19]

Parkinson et al.

[11] 4,134,192

[45] Jan. 16, 1979

[54] COMPOSITE BATTERY PLATE GRID

[75] Inventors: David B. Parkinson, Cleveland Heights; James T. Konishi, Willowick, both of Ohio

[73] Assignee: Gould Inc., Rolling Meadows, Ill.

[21] Appl. No.: 731,137

[22] Filed: Oct. 12, 1976

[51] Int. Cl.² .................. B23D 19/00; D03D 1/00; D03D 3/08
[52] U.S. Cl. ....................................... 29/2; 139/425 R
[58] Field of Search ............ 29/2; 139/425 R, 420 C; 429/234, 233, 211

[56] References Cited

U.S. PATENT DOCUMENTS

| | | | |
|---|---|---|---|
| 296,164 | 4/1884 | Haid | 429/234 |
| 353,511 | 11/1886 | Sorley | 429/234 X |
| 1,678,941 | 7/1928 | Helman | 139/425 R X |
| 2,381,218 | 8/1945 | Jacob | 139/425 R X |
| 3,288,175 | 11/1966 | Valko | 139/425 R |
| 3,377,581 | 4/1968 | Boles et al. | 139/425 R X |
| 3,378,629 | 4/1968 | Rask | 139/425 R X |
| 3,399,389 | 8/1968 | Bohannon, Jr. | 139/425 R X |
| 3,488,695 | 1/1970 | Dimon et al. | 139/425 R X |
| 3,556,854 | 11/1968 | Wheadon et al. | 429/211 X |
| 3,623,916 | 11/1971 | Toyooka et al. | 139/425 R X |
| 3,654,381 | 4/1972 | Copp | 139/425 R X |
| 3,808,054 | 4/1974 | Wheadon et al. | 429/211 |

FOREIGN PATENT DOCUMENTS 518614  3/1955  Italy ................................................ 29/2

Primary Examiner—Horace M. Culver
Attorney, Agent, or Firm—Russell E. Baumann; Edward E. Sachs

[57] ABSTRACT

A composite battery plate grid and processes for making the same are disclosed. The novel grid is a composite of a flexible electrically non-conductive web material with a plurality of electrically conductive threads interlaced therein. The web material provides structural support for the grid while the electrically conductive threads form electrical connections for collecting current from an active material on the grid. The electrically conductive threads are incorporated within the web material as warp threads in one embodiment and as weft or filler threads in another. A third embodiment discloses the electrically conductive threads integrated as a pattern within the web material in a combination of the warp and weft directions. A process embodiment is described for manufacturing the composite grids which includes weaving the electrically conductive threads together with threads of the web material to form an interlaced matrix of web material and conductor threads in any of the disclosed forms of the structural embodiments. A second process embodiment describes forming the composite grid structures by sewing or inserting the conductor threads into the web material after the material has been woven.

6 Claims, 10 Drawing Figures

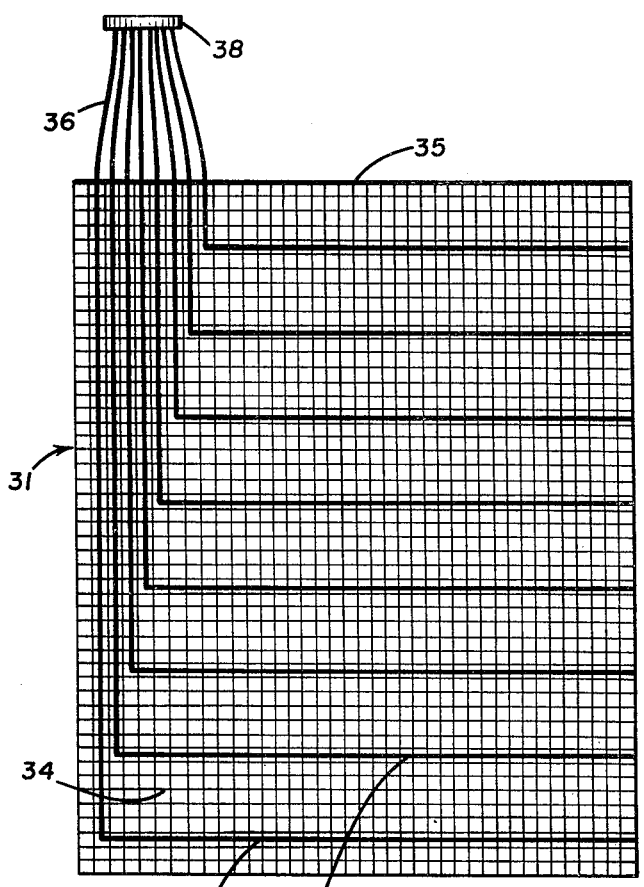
FIG.3
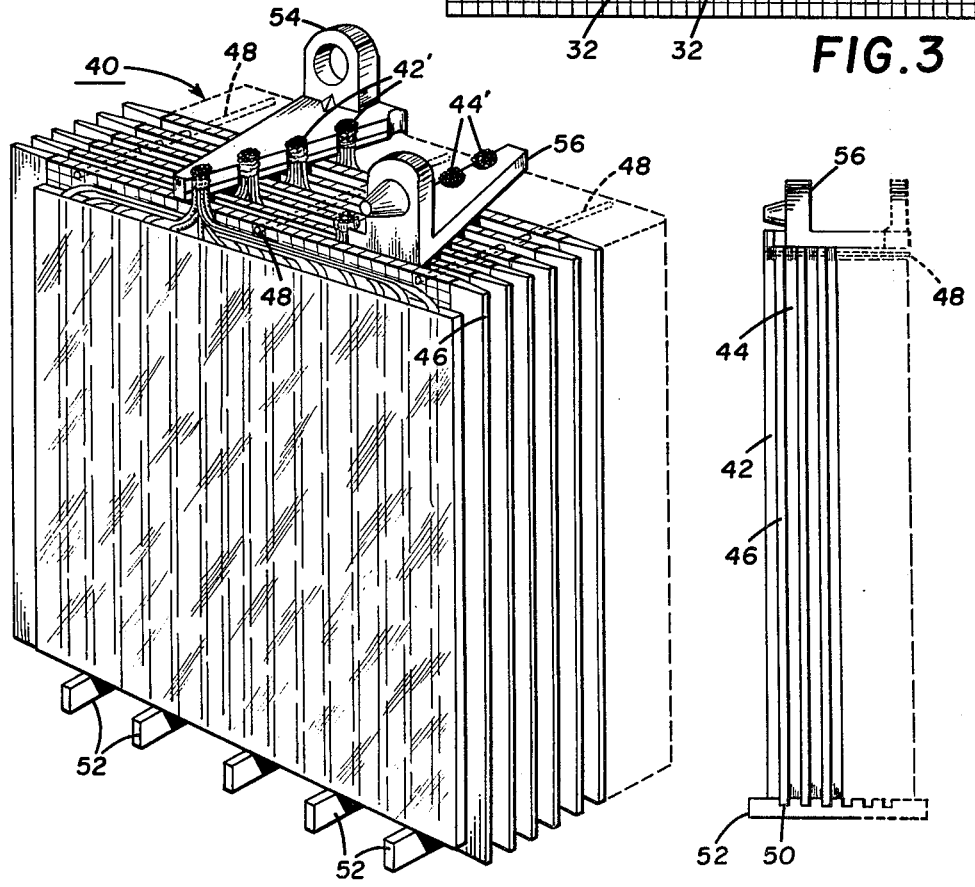
FIG.4
FIG.4a

TABLE A

|  | WOVEN GRID | | CAST GRID | |
| --- | --- | --- | --- | --- |
|  | POSITIVE | NEGATIVE | POSITIVE | NEGATIVE |
| GRID LEAD | 25 g | 19.7 g | 61 g | 58 g |
| FIBER GLASS | 1 g | 1.0 g | — | — |
| PASTE | 110 g | 91.0 g | 104 g | 86 g |
|  | 136 g | 111.7 g | 165 g | 144 g |
| CAPACITY | 14.3 A hr. | | 13.5 A hr. | |

COMPOSITE BATTERY PLATE GRID

BACKGROUND OF THE INVENTION

1. Field of the Invention

The invention pertains generally to the manufacture of lead-acid storage batteries and is more particularly directed to the provision of novel structures for battery plate grids and processes for making the same.

2. Description of the Prior Art

The lead acid storage battery, commonly termed a "secondary battery" because of its reversible charge-discharge cycle, is well known in the art. Normally such batteries are comprised of a plurality of "cells" in either series or parallel connection depending upon the capacity and voltage desired. It is the cell that is the basic unit of the battery and the component in which the electrochemical reaction producing the emf of the battery takes place. Each cell consists of a plurality of plates, usually odd in number, alternately spaced in opposite positive and negative polarities. All positive plates in a cell are electrically connected together as are all negative plates and each plate in an opposing pair is electrically insulated from the other by an electrolyte permeable separator.

The battery plates for a lead-acid storage cell of this type have generally in the past been formed of a cast lead alloy grid structure with an active material pasted thereon. The grid structure usually has a multiplicity of gratinglike apertures into which a paste of active material, conventionally containing some form of lead or lead oxide, is applied.

In this manner the usual grid structure provides a number of functions for the storage battery. First, it supports the active material and provides the structural strength of the plate. Additionally, the grid structure is utilized for the more important function of conducting electric current from the active material to an external electrode and for maintaining a somewhat uniform current collection from the active material.

These lead alloy grids are manufactured conventionally by casting molten lead alloy into grating shaped molds. The lead alloy grids have a number of disadvantages being formed in this manner.

The primary disadvantage of cast grids is one of weight. There is an excess of lead conductor over that necessary to provide the important function of current conduction away from the active material. This additional lead does not participate actively in the electrochemical process and contributes unnecessary mass to the structure. A battery with such excessive mass will have lower energy density or mass utilization than one which uses an optimum amount of lead.

There have been attempts in the prior art to provide grids with an improved mass utilization. For example, plating lead onto a lighter grid material has been tried. Also, a U.S. Pat. No. 3,944,432, issued to Brinkmann et al, discloses a storage battery plate having lead bars positioned within channels defined by a grid of plastic strips. Further, a U.S. Pat. No. 3,944,431, issued to Ikari et al, describes a battery plate grid comprising a plurality of longitudinally spaced wire elements, each having a lead or lead alloy conductor helically wrapped around it. Although these prior art plates are successful to some extent in improving the mass utilization of lead, they are relatively expensive and complicated to manufacture and thus not entirely commercially acceptable. The problem therefore remains substantially unresolved by the prior art.

The use of excess lead in conventional cast grids has been mainly to provide the function of structural support for the battery plate and active material. It would alleviate this problem if the lead could be used only as a conductor and not structurally. However it is common in the art to alloy the lead with a number of elements to increase its structural strength for the support function at the expense of electrical considerations and corrosion resistance.

Normally, the most common additional element is that of antimony which increases the structural integrity of the lead and facilitates the casting process. Other known lead alloys are those which employ calcium, arsenic, tellurium, tin, and cadmium in combination with basic lead. The more exotic of these alloys are difficult and expensive to provide while the most common, antimony, is objectionable because it decreases the corrosion resistance of the lead. Lead-antimony alloy also promotes decomposition of the electrolyte upon charging and is less conductive than is pure lead conductor. Thus, it would be advantageous to use pure lead for battery grids instead of relying on alloys to provide additional stiffness to the lead because of its use as a structural support.

A further disadvantage of alloyed cast grids is their manufacture by the casting process. It would be beneficial to provide an improved process that would replace conventional battery plate grid manufacturing techniques.

Another problem to be confronted with presently available cast grids is that of "sloughing" or shedding. This phenomenon occurs when the active material becomes soft and disassociates from the grid structure. The adherence by the active material to the grid structure would be greater and cause less sloughing if the grating openings were smaller and less open. However, such a change would exacerbate the already serious mass utilization problem and use even more lead. Sloughing cuts the efficiency of the battery plates and may short out the cell if enough material becomes disloged and accumulates at the bottom of the cell between plates. The cycle life of a battery could be significantly altered by controlling this effect.

SUMMARY OF THE INVENTION

The invention provides a battery plate grid compositely formed of a flexible web material with a plurality of electrically conductive threads interlaced therein. The web material performs the function of providing structural support for the active material and the conductor threads. The amount and positioning of the conductor threads interlaced within the web is substantially governed by corrosion characteristics and by the electrical considerations of conducting the maximum amount of current from a given active material with the least amount of conductor, thus providing a considerable weight reduction over conventional grids. The mass utilization of lead conductor is thereby greatly improved over conventional cast grids.

Another advantage of the invention provides for its use in a lead-acid battery application where pure lead conductor threads increase conductivity and efficiency of the composite plate structure. The use of pure lead conductors further reduces corrosion and electrolyte decomposition.

According to one aspect of the invention, the composite battery plate grid is manufactured by weaving the conductor threads with threads of the web material to produce an integrated final grid. The conductor threads are interspaced with web material thread in the warp direction while weft web material filler threads are interlaced by weaving. Another feature of this aspect of the invention provides warp threads of the web material and the subsequent weaving of conductor threads and web material filler thread in the weft direction. Still another feature of this aspect of the invention includes providing conductor threads that are initiated as either warp or weft thread and are then woven into a pattern with threads of the web material in a combination of warp and weft directions.

According to another aspect of the invention, the composite battery plate grid is manufactured by sewing the conductor threads into prewoven web material. The insertion into the web material of the conductor threads can be accomplished in the warp direction, the weft direction, or in combination of warp and weft directions forming a pattern.

The composite structure consequently permits a method of manufacture that eliminates many of the objectionable features of casting grids for lead acid batteries. The problem of sloughing is also reduced by the manufacture of grids by the processes disclosed. The apertures or openings in the web materials can be easily tailored to produce an optimal size for the adherence of the pastelike active material without adding substantially to the weight of the grid.

Therefore, it is a broad object of the invention to provide a lead-acid battery plate grid with an increased weight utilization factor for lead.

It is another object of the invention to provide a lead-acid battery plate grid that reduces the manufacturing costs for batteries in comparison to that of conventional cast grids.

It is still another object of the invention to provide a lead-acid battery plate grid that is easier to manufacture than conventional cast grids.

Further, it is an object of the invention to provide facile methods of manufacture for lead-acid battery plate grids with an increased weight utilization factor for lead.

Still further, it is an object of the invention to provide a composite woven battery plate grid that is advantegeously used in many different types of batteries.

These and other objects, features, and advantages of the invention will be more fully understood and appreciated upon reference to the following detailed description taken in conjunction with the appended drawings wherein:

BRIEF DESCRIPTION OF THE DRAWINGS

FIG. 3 is an elevational view of a lead-acid battery plate with lead conductors oriented patternwise in a combination of warp and weft directions and constructed in accordance with the invention.

FIG. 4 is a pictorial perspective view of a lead-acid battery cell construction utilizing the type of battery plates illustrated in FIGS. 1–3.

FIG. 4a is a side elevational view of the lead-acid battery cell illustrated in FIG. 4.

DETAILED DESCRIPTION OF THE PREFERRED EMBODIMENTS

Figure 1:
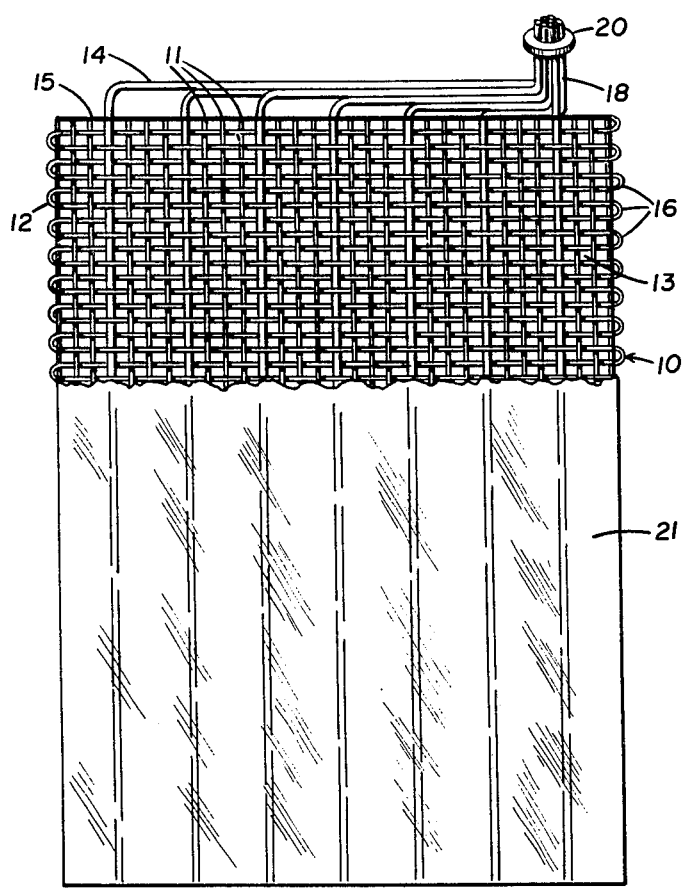
FIG. 1 is an elevational view of a composite lead-acid battery plate with lead conductors oriented as warp threads and constructed in accordance with the invention.

FIG. 1 of the drawings illustrates a preferred embodiment of a composite battery plate grid constructed in accodance with the invention. Generally, a composite battery plate grid 10 is comprised of at least two components. The first component is a flexible web material 12 and the second a lead conductor thread 14. The two components are woven in an interlaced fashion to produce the completed battery plate grid 10 with lead conductor threads 14 spaced at substantially equal intervals along the longitudinal or warp direction of the grid. This equal spacing of the lead conductor thread 14 promotes uniform current collection from an active material applied upon the grid 10. The lead conductors thus interlaced at equal spacings is the preferred form of the invention but a grid can be manufactured having unequal spacings. The equivalent spacings are maintained by a plurality of threads 11 of the web material 12 woven between pairs of the lead conductors 14.

A plurality of filler threads 16 of web material 12 are interlaced laterally to form a composite matrix binding the warp threads of lead conductor and web material together. The lead conductors 14 are then collected and formed into a plate terminal 18 with a band 20 retaining them. The plate terminal 18 can be formed in a number of other ways known in the art such as flame burning or melting the warp lead conductors 14 together, mechanically crimping the ends together, resistance welding, or the like.

In order to form a battery plate, the completed grid 10 can be pasted with an active material 21, (shown cut away to illustrate the top of the grid), cured, and electrochemically formed in a conventional manner. The composition of the active mass for both positive and negative plates is conventional and well known in the art.

The grid illustrated is advantageously used as either a positive or negative plate depending on the type of active material applied to the composite matrix and the formation step. Less lead, fewer conductors 14, or those of a smaller diameter, can be used for the negative grid than is used for the positive grid because of corrosion characteristics. Also the negative active material has a higher inherent conductivity than the positive active material.

In general the active material 21 substantially covers the composite grid 10 filling all the interspaces 13 between the web material 12 and lead conductors 14. The battery grid is bilateral and the active mass 21 is deposited on both sides of the grid 10. A supporting edge 15 is left unpasted to provide for the mounting of the completed plate 10. The edge 15 can be formed of normal or thickened web material in a number of different configurations. Additionally, the supporting edges 15 of the web material can be epoxied or otherwise stiffened to facilitate ease of handling.

The first component of the composite grid, the flexible web material 12, is preferably threads comprised of glass fibers. The glass fiber thread is chosen because of its superior strength to weight ratio over lead. Additionally, fiber glass is acid and corrosion resistant which is an important requirement for a lead-acid battery component. Chemical grade fiber glass is more corrosion resistant than electrical grade fiber glass and hence a preferred choice for the battery plate grid 10. It is commercially available at a relatively inexpensive cost in relation to lead and is easily handled. Further, glass fiber threads may be woven in a facile manner into the composite textilelike grid 10.

However, other materials that can be manufactured into thread and exhibit similar properties to glass fiber could be used for the web material 12. An alternative choice might be quartz fiber threads. Also, synthetic resin fibers including plastics would be useful if their tensile strengths are sufficiently great and they are acid resistant. Fibrous carbon is still another choice for the web material 12. The web material may be insulative or conductive but if conductive care must be exercised to not short the grids of the opposite polarity together. A prime requirement is that the tensile strength of the web material must exceed the weight load of the active mass and grid lead conductors placed upon it.

The web material 12 can further be a material or combined with other materials, as is conventionally known in the art, which will stiffen the supporting threads of the web material upon treatment with heat or chemicals. Such treatment will provide a more rigid grid structure that will be easier to paste with active material 21.

According to an important aspect of the invention the superior structural (tensile) strength of the web material 12 over lead is used to support the grid 10 and an active material applied thereon thus eliminating the necessity of structural lead presently incorporated in cast grids.

Figures 5, 5A, 6:
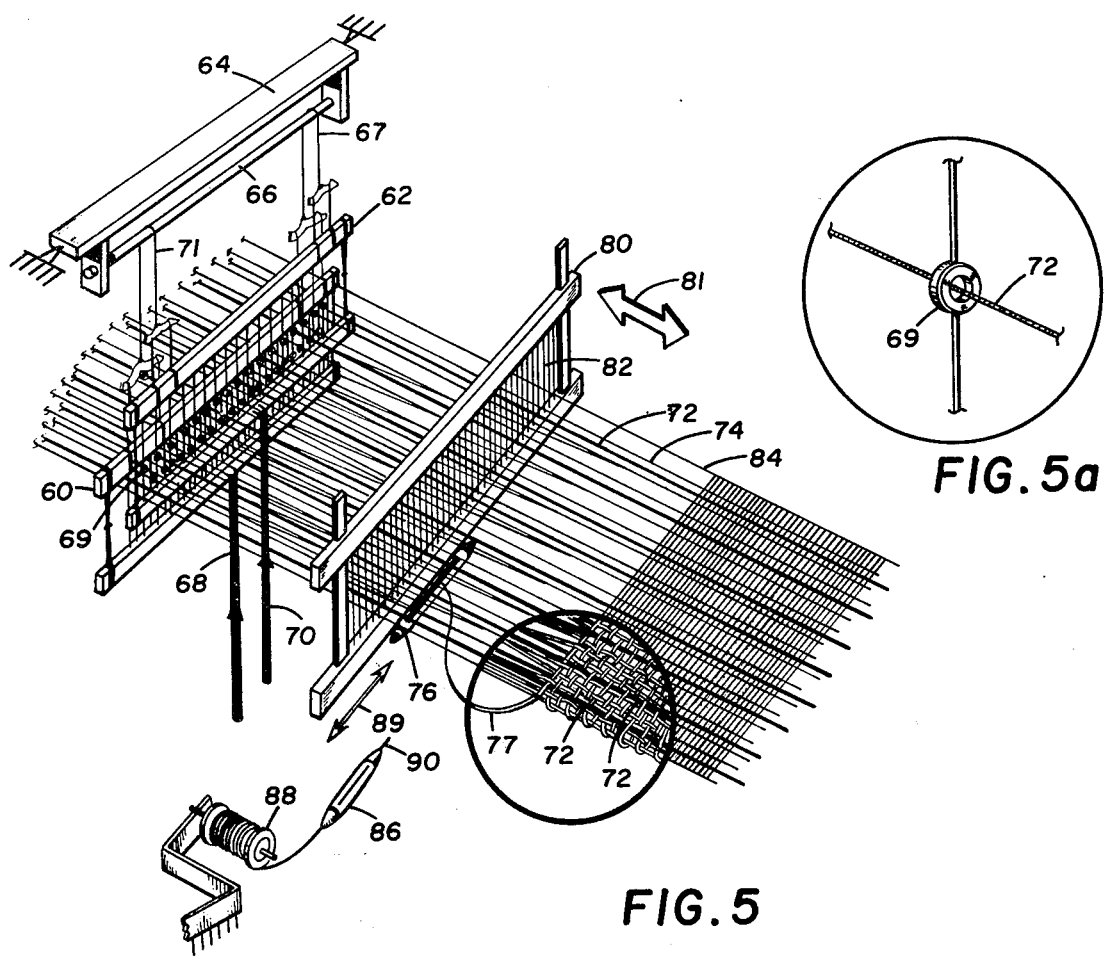
FIG. 5 is a schematic pictorial view of a manufacturing process for weaving the lead-acid battery plates illustrated in FIGS. 1–3.
FIG. 5a is an enlarged pictorial view of an eyelet for the manufacturing process illustrated in FIG. 5.
FIG. 6 is a tabulation comparing the weight of battery plates using a woven grid and a conventinal cast grid.

The amount of savings of structural grid lead for an exemplary woven composite grid as compared to a cast grid is illustrated in the table A of FIG. 6. A positive cast grid battery plate having an ampere hous capacity of 13.5 A hr. has a weight of 165 grams comprising 104 g. of active material and 61 grams of grid lead. Similarly, a negative cast grid battery plate matching the positive plate described above weighs 144 grams. Of this, 86 grams are allocated for the active mass and 58 grams are comprised of grid lead. It is seen that a substantial percentage of a battery plate having a cast grid is grid lead.

A woven grid substantially as that described for FIG. 1 using the lead conductor threads for current conduction and not structural support requires only 25 grams of lead for the positive grid of 14.3 ampere hours capacity. The 36 grams of excess lead of the cast grid has been replaced by 1 gram or less of fiber glass web material. Thus, a savings greater than 50% of the grid weight and hence grid material cost has been effected in this manner. Similarly, the negative grid requires only 19.7 grams of lead for conduction purposes as compared to the 58 grams necessitated by the cast grid. Even a greater percentage of savings in grid lead is evident with the negative grid than with the positive.

In this example, the active area of the exemplary plate would measure approximately 5.7 inches by 5.5 inches. Sixteen equally-spaced pure lead conductor threads are woven into each plate to provide the conductive grid. Tests indicate that a 0.036 inch diameter lead wire is satisfactory as a conductive thread for the positive thread for the positive grid and that a 0.032 inch diameter wire will be more than adequate for the negative grid. With this configuration, each plate requires approximately 131 inches of the lead conductor. In the example, fiber glass is utilized for both the warp and filler thread. Thirty-four yards of 7500 yd/lb glass thread are required when the warp threads are spaced at approximately 12 thread/inch, and two double threads of filler are used between each pair of grid wires.

It is envisioned six pairs of such plates would make up a cell approximately 1.14 inches thick. This is somewhat less than the present 13 plate cast grid cell. The even number of plates for the woven grid cell having one plate less than the usually required number, is the reason for increasing the individual capacity of each plate (14.3 A.hr. as opposed to 13.5 A.hr.).

As is evident most conventional battery plate types and sizes can be manufactured in this manner. Certain other special battery plates such as thick plates can be manufactured in a facile manner using the composite grid 10. For a thick plate structure a plurality of composite grids 10 can be laminated together before the active material 21 is cured and formed. The plate terminals of all the laminations are electrically connected together to form a battery plate of substantially any thickness and capacity.

The lead component threads 14 comprise threadlike wires of either pure lead or a lead alloy. The alloying materials as known in the art may be antimony, calcium, arsenic, tellurium, tin, cadmium, or the like, in combination with basic lead. Tantalum and titanium may be additional choices for the conductors in lead-acid batteries. Preferably, however, the lead conductor threads 14 are made of pure lead because of its superior conductivity, electrochemical properties, and corrosion resistance over the other alloys and materials in lead-acid battery applications. "Pure lead" in this sense means lead without a significant percentage of impurities or alloying materials, for example, less than 2%. The lead conductor threads 14 can be advantageously manufactured by wire extrusion and drawing processes which are conventional in the art. Normally, the pure lead could not be used in battery plate grids without excessive weight because of its low tensile strength but, according to the invention, the lead conductor is used substantially for conduction of battery current and is relieved of any structural function. This feature allows an optimal amount of lead to be used thereby reducing weight and improving mass utilization as herebefore described. In other than lead-acid batteries, the threads of lead conductor may be replaced as appropriate by other conductive materials such as nickel, silver, tin, zinc, carbon, or similar electrode materials.

The active material 12 in paste form may be applied directly to the grid 10. The openings in the weave and component crossings of the grid 10 provide adherence points for the active material and allow the paste to more readily cling to the woven grid than would occur for a conventional cast grid. This feature will reduce sloughing that produces detrimental effects to battery life.

The openness of the weave of the grid 10 will determine the amount of active material that will be deposited on the grid and its adherence thereto. The weave should be close enough to provide adequate support for the grid and active material but loose enough to permit satisfactory bonding of the paste through the web in an adequate amount. The grid structure may be changed from a closed or open weave depending on those parameters and the type and composition of the active material utilized. The weave ratio can advantageously be used to also suit the purposes for which the battery is to be used. Generally, it has been found an open area to grid weave ratio of at least 20% and not over 90% is advantageous. If an open pattern is used, sizing can be used to prevent the threads from excessive lateral movement during the manufacturing process. Thus, an advantageous structure for controlling sloughing has been provided according to the invention.

The interlacing of the dual component weave may be accomplished in either a plain weave as shown in FIG. 1 in a twill weave, or a satin weave. Generally, it is important only to adequately support the lead conductors and active material and many different types of weaves or combinations thereof may be utilized. Preferably, the threadlike conductors should present approximately equal surface areas on each side of a grid as the plates are bilateral and each side should produce equivalent current densities.

Figure 2:
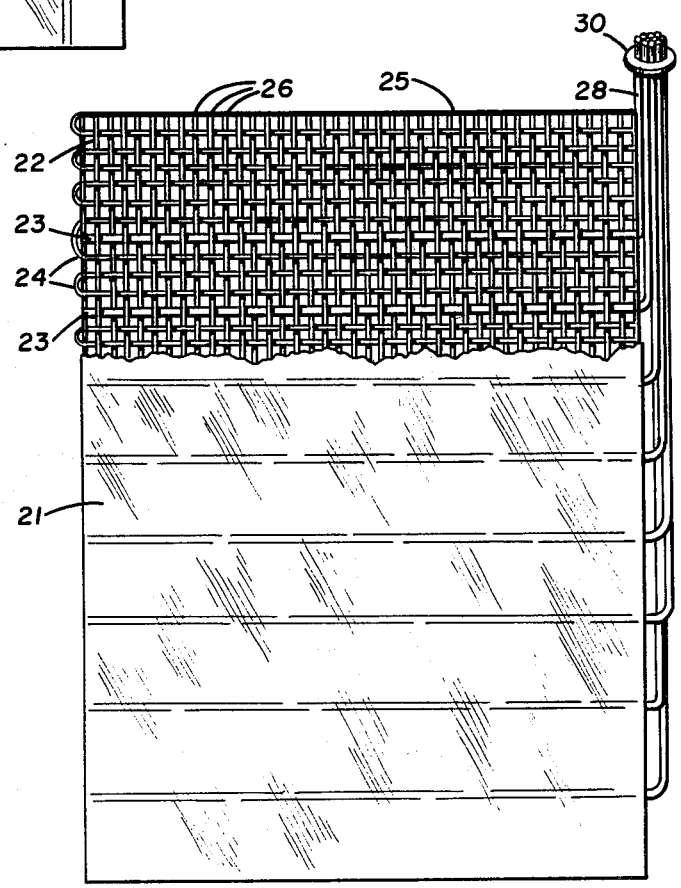
FIG. 2 is an elevational view of a lead-acid battery plate with lead conductors oriented as weft threads and constructed in accordance with the invention.

Illustrated in FIG. 2 is a second embodiment of a composite grid according to the invention. A plurality of lead conductor threads 23 have been interlaced with the threads 22 of the web material to form a composite matrix where the conductors are placed laterally in the weft direction. The lead conductors 23 are separated in a parallel equally-spaced arrangement by filler threads 24 of the web material. Warp threads 26 of the web material are provided longitudinally for support. In this embodiment, more supporting warp threads 16 are provided in the warp direction so that a heavy active mass can be supported. The lead conductors 23 are collected along one side of the grid to form a plate terminal 28 with a connecting band 30 similar to the first embodiment. A supporting edge 25 is provided for mounting purposes similar to that discussed for the first embodiment.

Illustrated advantageously in FIG. 3 is another embodiment of a composite grid 31 according to the invention. In the grid shown the lead conductor threads 32 were started as weft or lateral threads and subsequently interlaced with web material threads 34 in a combination of the warp and weft directions. This type of pattern conveniently collects the lead conductor threads 32 into a plate terminal 36 which may be crimped with a band 38. A supporting edge 35 is provided for supporting the grid 31.

It is evident from the three illustrated preferred embodiments that other patterns are capable of being created in a composite grid where the web material will form a background and the lead conductor thread the pattern.

Another pattern is with lead conductors spaced unevenly or with lead conductors crossing in warp and weft directions. Likewise, many other types of conductor patterns are obvious and the invention should not be limited to the three preferred patterns illustrated as the form of the composite grid permits a great flexibility in pattern design. However, the web material should always be used substantially for the structural support and the lead conductor pattern essentially for current transportation from the active material.

FIGS. 4 and 4a illustrate a plurality of the composite grids assembled into a battery cell 40 shown partially in phantom. The cell comprises a set of positive plates 42 and a set of negative plates 44. Each positive plate 42 is spaced from contact with an opposing negative plate by a separator 46.

The separators for the positive and negative battery plates are common in the art and include permeable plastics, porous-type rubber mats, fibrous mats bound by resins, fiber glass mats, wood, etc. The separators 46 permit a free flow of electrolyte between the positive and negative plates to allow the electrochemical battery reaction to take place while preventing the plates from physically contacting one another.

In some applications, the plates can be supported on their top edges by a series of mounting rods 48 which pass through the separators 46. The separators are shown freestanding in notches 50 of spacer bars 52.

The plate terminals 42' of the positive plates 42 are connected together by a conventional element strap 54 by fusion such as burning. A negative element strap 56 is similarly provided for the terminals 44' of the negative plates 44. The element straps 54, 56 provide a means for connecting the cell 40 to other cells in order to manufacture multi-cell batteries.

A preferred manufacturing process for producing the woven grids is more readily understood by reference to FIGS. 5 and 5a. There is shown a framelike odd warp harness 60 alongside an even warp harness 62. Each harness comprises a plurality of laterally spaced heddles, each with a centered eyelet 69. The harnesses 60, 62 are illustrated as connected together at each end by a tether 67 and a tether 71. The tethers 67, 71 loop over a support member 66 in a stationary rack 64. The configuration can move in oppositely reciprocal directions under the influence of forces 68 and 70 (shown schematically). Even numbered warp threads are threaded through one set of eyelets in the heddles of harness 62 (as illustrated in FIG. 5a) and the odd warp threads through the other set in harness 60. As was described above, the warp threads in the embodiment comprise lead conductor threads 72 and fiber glass spacer threads 74.

As one harness, for example harness 62, raises the even numbered warp threads, the other harness 60 lowers the odd numbered warp threads to form "V"-shaped divarication termed a shed. When the shed is opened, a shuttle 76 filled with weft fiber glass filler thread 77 is transported across the shed to leave a pick of fiber glass thread between the two halves of the shed. Subsequently, harness 62 and harness 60 are returned to the center point and a reed 80 having a frame filled with a plurality of rods 82 moves forward in the direction of arrow 81 to push or beat the fiber glass pick up to a fell 84 in the woven grid. The shed is then formed alternately with harness 60 raised and harness 62 lowered and the process repeated. The woven grid is cut to shape, has its plate terminal formed, and then can be pasted in the various aforementioned ways after the weaving is accomplished.

If weft conductors are used, as for example to manufacture the embodiment illustrated in FIG. 2, the warp threads used will be entirely web material. At appropriate intervals a second shuttle 86 attached to a lead thread 90 and to a supply roll 88 will be transported across a shed leaving a pick of lead conductor. The shuttle 86 will be reciprocated in the direction of arrow 89 and the lead conductor 90 cut and subsequently beaten into the fell by the reed 80. Filler threads of web material are thereafter woven into the warp threads by the shuttle 76 until another pick of lead conductor is desired and the process repeated. The grid is cut to shape, the plate terminal is formed, and can thereafter be pasted as hereinbefore mentioned.

A plain weaving process has been described but it is evident other weaves may be employed in the process according to common useage in the art. Patterns of lead conductor within a background of web material are possible. The patterns can be formed by the process described by controlling independently each warp thread such as in a Jacquard Loom or by programming a multiplicity of frames such as in a Dobby Loom.

Thus it is seen that this process provides great flexibility in the manufacture of compositely formed battery grids while eliminating many of the objectionable features of the casting process.

Figure 7:
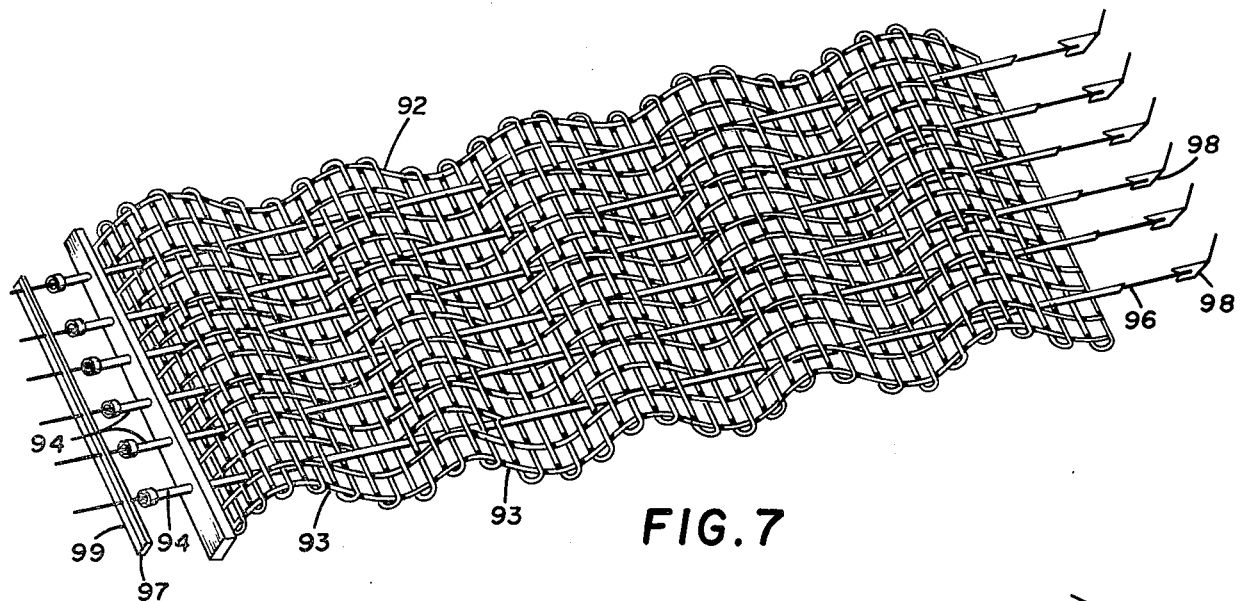
FIG. 7 is a schematic pictorial view of an alternative manufacturing process for producing the lead-acid battery grid illustrated in FIG. 1 with the lead conductors oriented in the warp direction.
Figure 8:
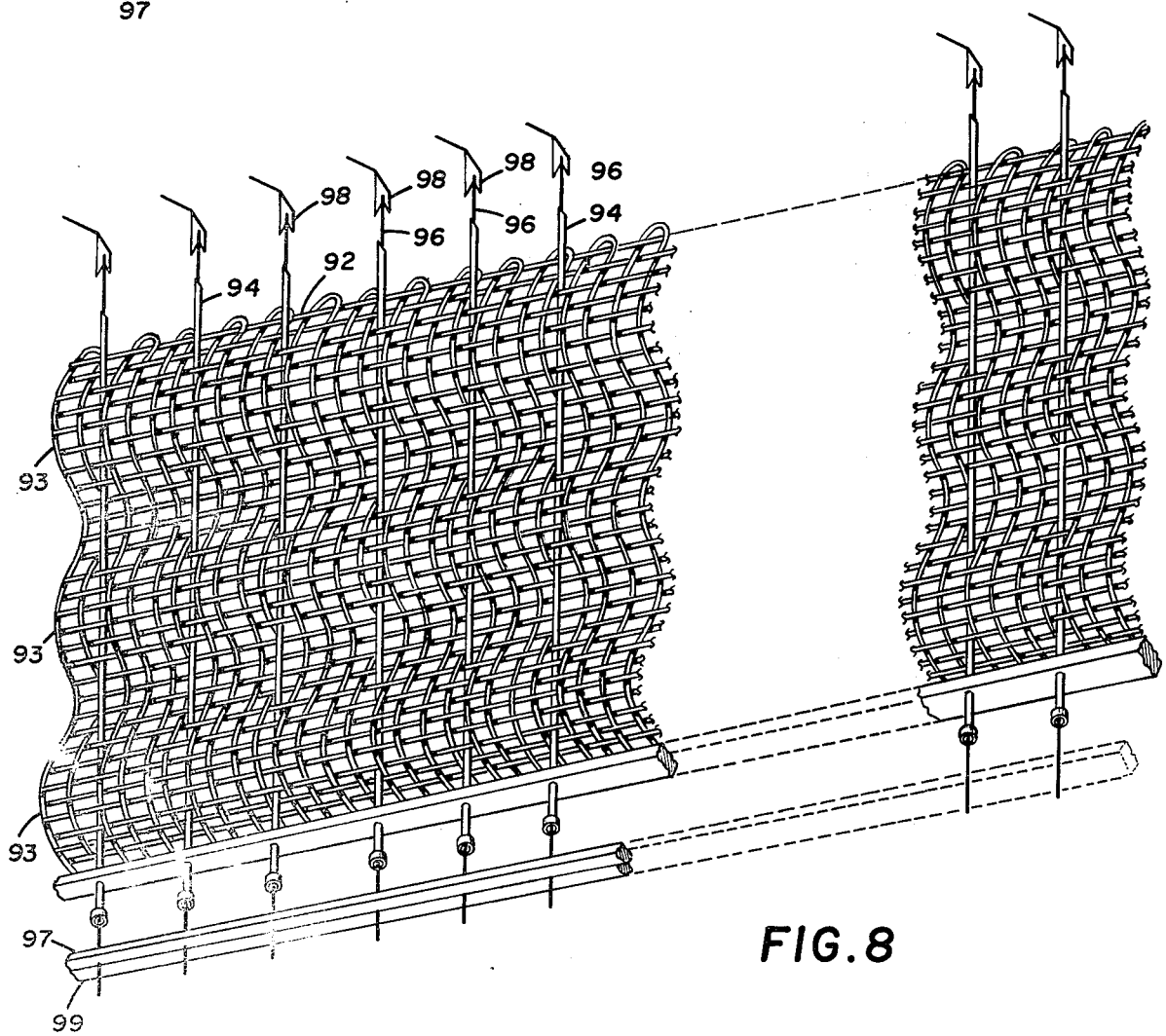
FIG. 8 is a schematic pictorial view of the process illustrated in FIG. 7 with the lead conductors oriented in the weft direction.

FIGS. 7 and 8 illustrate another advantageous process for forming the composite grids. In the method the lead conductor is inserted or sewn into prewoven pieces of web material.

In FIG. 7 a prewoven piece 92 of web material is shown. The piece 92 is cut to the size of the desired composite grid and has a woven structure chosen for the grid according to the parameters hereinbefore disclosed. The piece of web material is preferably woven fiber glass thread or the substitutes mentioned in the disclosure.

The web piece is corrugated into undulatory folds 93 and needles 94 inserted through the folds in the warp direction. The needles 94 are hollow and transport lead conductor thread 96 through the folds 93 upon their insertion. At the end of the web piece are a series of gripping elements 98 which hold the lead conductors 96 in place while the needles 94 are withdrawn from the prewoven piece 92. While being inserted the lead conductors 96 are held in place by locking bars 97, 99 which release once the grippers 98 have attached themselves. Subsequently, the lead conductors are cut and the prewoven material stretched flat.

FIG. 8 shows that the needles 94 may be alternatively inserted in the weft direction of the web material 92. In FIGS. 7 and 8 identical reference numerals indicate the same elements. Numerous other patterns can be chosen for insertion as was disclosed for the weaving process.

One common pattern of grid that would be available is a composite matrix with the lead conductor in a fan-shaped array spreading angularly from a collection point.

The insertion of the needles 94 in a straight line through either transverse or lateral corrugations is preferred since the web material is very flexible and the lead conductor is less conveniently bendable. However, by using the needles in a running stitch it is possible to insert or sew the lead conductor when the web material is held flat.

The number of corrugations in the web material need only be limited by the flexibility of the material but there should be enough to adequately support the lead conductors 96 when the material is stretched flat. The corrugations are preferably regular because of the bilateral nature of the grid. Normally, there should be an equal amount of conductor on each side but this is not critical.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A method for manufacturing a composite battery plate grid comprising the steps of:
   providing a flexible prewoven web material formed of threads, said web material having undulations;
   providing threads of an electrical conductor;
   passing guide means through said undulations;
   inserting a plurality of the conductors through said guide means into the web material such that the conductors are supported by interlacings of the web material and that the conductors and the web material together form a composite fabric having a first portion comprising at least a portion of both of said prewoven threads and said electrical conductor threads for subsequently supporting an active material to form a battery plate, and a second portion comprising essentially only said prewoven threads for subsequently supporting a battery plate formed when an active material is applied to said first portion; and
   forming the ends of the conductors into a plate terminal for the collection of grid current.

2. A method for manufacturing a composite battery plate grid as defined in claim 1 wherein the step of insertion includes:
   inserting said conductors essentially parallel to each other at substantially regular intervals in the warp direction of the web material.

3. A method for manufacturing a composite battery plate grid as defined in claim 1 wherein the step of insertion includes:
   inserting said conductors essentially parallel to each other at substantially regular intervals in the weft direction of the web material.

4. A method for manufacturing a composite battery plate grid as defined in claim 1 wherein the step of insertion includes inserting said conductors in a pattern which is a combination of warp and weft directions.

5. A method for manufacturing a composite battery plate grid as defined in claim 1 wherein the step of insertion includes inserting said conductors in a pattern which angularly spreads from the plate terminal in a fan shaped array.

6. A method according to claim 1, wherein said flexible prewoven web material has from about 20% to about 90% open space between its threads.

* * * * *